(12) United States Patent
Bekiares et al.

(10) Patent No.: US 9,344,861 B1
(45) Date of Patent: May 17, 2016

(54) METHOD AND APPARATUS FOR DELAYED TALK-BACK IN PTT SYSTEMS (71) Applicant: MOTOROLA SOLUTIONS, INC, Schaumburg, IL (US)

(72) Inventors: Tyrone D. Bekiares, Park Ridge, IL (US); Anatoly Agulnik, Deerfield, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/585,274

(22) Filed: Dec. 30, 2014

(51) Int. Cl.
*H04B 7/00* (2006.01)
*H04W 4/10* (2009.01)

(52) U.S. Cl.
CPC ........................................ *H04W 4/10* (2013.01)

(58) Field of Classification Search
CPC .......................................................... H04B 4/10
USPC ......................................... 455/517, 518, 519
See application file for complete search history.

(56) References Cited

U.S. PATENT DOCUMENTS

| | | | |
|---|---|---|---|
| 7,536,180 B2 | 5/2009 | Yoon et al. | |
| 7,542,756 B2 | 6/2009 | Mason et al. | |
| 7,570,975 B2 * | 8/2009 | Oprescu-Surcobe | H04W 52/0225 340/7.32 |
| 7,602,895 B2 | 10/2009 | Terry et al. | |
| 8,473,549 B2 | 6/2013 | Drozt et al. | |
| 8,761,823 B2 * | 6/2014 | Shuman ................... | H04W 4/10 370/260 |
| 2005/0090228 A1 * | 4/2005 | Black ....................... | H04W 4/10 455/405 |
| 2006/0019681 A1 * | 1/2006 | Harris ................. | H04W 72/121 455/464 |
| 2007/0091836 A1 * | 4/2007 | Oprescu-Surcobe | H04W 52/0225 370/318 |
| 2009/0032562 A1 | 2/2009 | Glass | |
| 2010/0248770 A1 * | 9/2010 | Shuman ................... | H04W 4/10 455/518 |

FOREIGN PATENT DOCUMENTS

AU 2008204404 B2 5/2013

* cited by examiner

*Primary Examiner* — Tilahun B Gesesse (57) ABSTRACT

A method and apparatus for delayed talk-back behavior in a communication device associated with a Push-to-Talk (PTT) system include presenting talk-burst audio to a user at the communication device, wherein the talk-burst audio is delayed; receiving a PTT request from the user; determining a delay time interval between the PTT request and a time when the talk-burst audio was originated; and performing an action for the PTT request based on the delay time interval, wherein the time interval is utilized to determine if the action is a standard PTT response or an alternative PTT response to the PTT request.

6 Claims, 8 Drawing Sheets

METHOD AND APPARATUS FOR DELAYED TALK-BACK IN PTT SYSTEMS

BACKGROUND OF THE INVENTION

In communication systems, Push-to-Talk (PTT) is a process of having conversations or talking in a half-duplex manner, including via a two-way radio system, using a trigger mechanism to switch from voice reception mode to transmit mode. Each discrete transmission of audio is generally known as a "talk-burst". As described herein, PTT systems can be implemented through wireless systems such as European Telecommunications Standards Institute Digital Mobile Radio (ETSI-DMR), Terrestrial Trunked Radio (TETRA), Project 25 (P25), Land Mobile Radio (LMR), Long Term Evolution (LTE), Code Division Multiple Access (CDMA), Global System for Mobile Communications (GSM), and the like. PTT is often used in conjunction with group distribution, such that audio from any one user in a group is distributed to all other users in the same group.

It is anticipated that future PTT systems may include an ability to present time delayed audio to users, i.e., delayed talk-bursts. Certain talk-bursts may be presented to one or more users in a time delayed fashion (with respect to "live") under certain circumstances. On occasion, a receiving user may desire to respond to the presentation of a delayed talk-burst. Because the presentation of the audio may be significantly delayed with respect to the time when it originated from the sourcing user, it is not always appropriate to simply direct talk-back audio to the talk-group or talker (in the case of a 1-to-1 call) originally associated with the delayed audio. Among other reasons, the talker may no longer be available or the context of the talk-group discussion may have shifted to a new topic.

Accordingly, there is a need for a method and apparatus for delayed talk-back in PTT systems that determines an appropriate talk-back action when a user is hearing a combination of real-time and delayed audio.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for delayed talk-back behavior in a communication device associated with a Push-to-Talk (PTT) system includes providing talk-burst audio to a user at the communication device, wherein the talk-burst audio is delayed; receiving a PTT request from the user; determining a delay time interval between the PTT request and a time when the talk-burst audio was originated; and performing an action for the PTT request based on the delay time interval, wherein the time interval is utilized to determine if the action is a standard PTT response or an alternative PTT response to the PTT request.

In another exemplary embodiment, a communication device configured for delayed talk-back behavior in a Push-to-Talk (PTT) system includes a network interface coupled to a processor; and memory storing instructions that, when executed, cause the processor to: provide talk-burst audio to a user of the communication device, wherein the talk-burst audio is delayed; detect a PTT request from the user; determine a delay time interval between the PTT request and a time when the talk-burst audio was originally provided; and perform an action for the PTT request based on the delay time interval, wherein the time interval is utilized to determine if the action is a standard PTT response or an alternative PTT response to the PTT request.

In a further exemplary embodiment, a Push-to-Talk (PTT) controller configured for delayed talk-back behavior includes a network interface coupled to a processor; and memory storing instructions that, when executed, cause the processor to: provide talk-burst audio to a user of the communication device, wherein the talk-burst audio is delayed; receive a PTT request from the user; determine a delay time interval between the PTT request and a time when the talk-burst audio was originally provided; and perform an action for the PTT request based on the delay time interval, wherein the time interval is utilized to determine if the action is a standard PTT response or an alternative PTT response to the PTT request.

Figure 1:
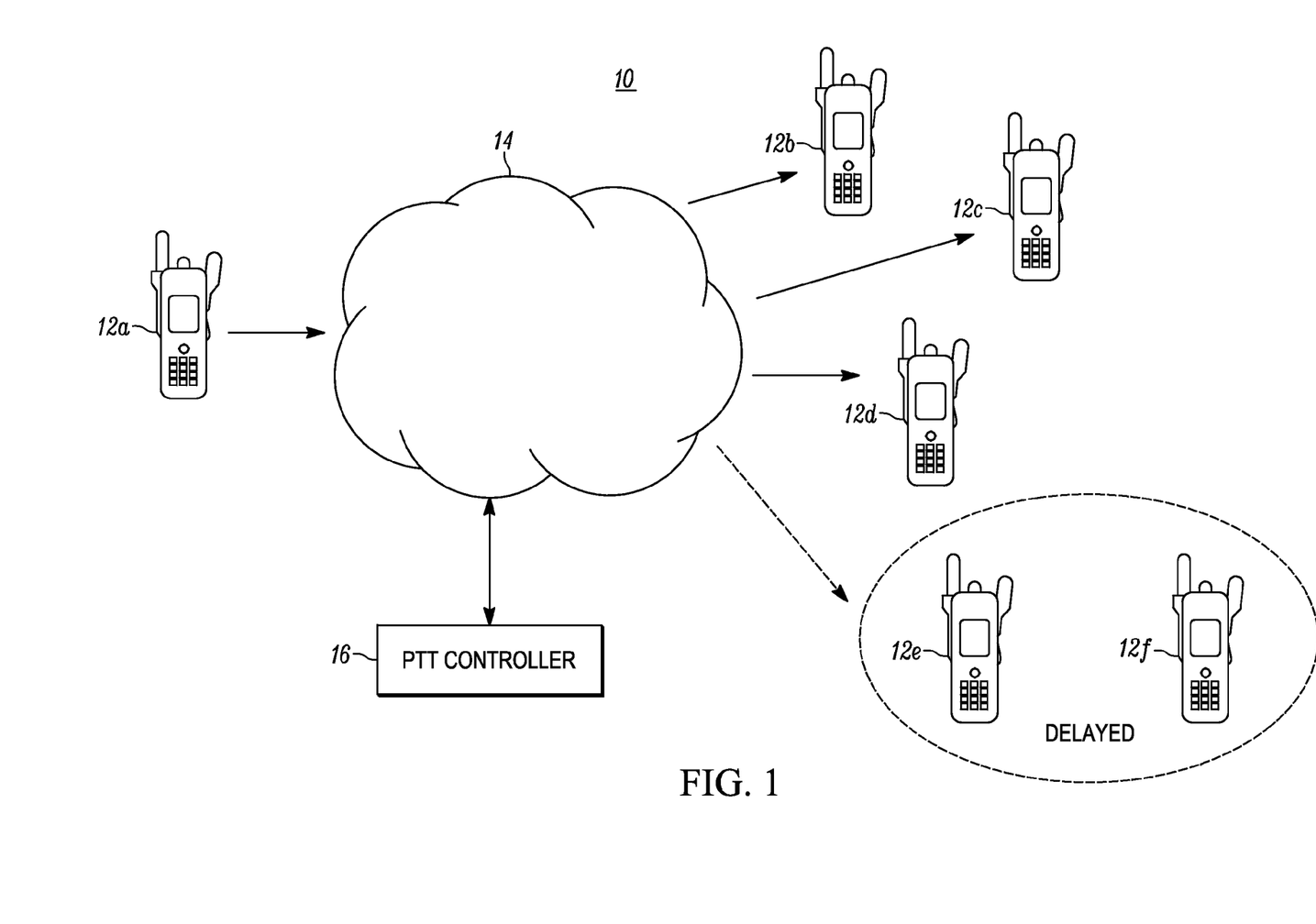
FIG. 1 is a network diagram of a communication system for illustration of the method and apparatus for delayed talk-back in PTT systems in accordance with some embodiments.

FIG. 1 is a network diagram of a communication system 10 for illustration of the method and apparatus for delayed talk-back in PTT systems. The communication system 10 includes a plurality of communication devices 12 (depicted as communication devices 12a-12f) which are communicatively coupled to a wireless infrastructure 14. The communication system 10 can include ETSI-DMR, TETRA, P25, LMR, LTE, GSM, CDMA, or the like. The communication system 10 can further include a PTT controller 16 communicatively coupled to the wireless infrastructure 14 which is configured to facilitate PTT calls between users associated with the communication devices 12a-12f. Note, the communication system 10 is presented for illustration purposes only and other embodiments are also contemplated with the method and apparatus for delayed talk-back in PTT systems.

In an exemplary embodiment, the communication devices 12a-12f can be in a talk-group which is an assigned group for group calls with or without the PTT controller 16. Thus, the communication devices 12a-12f and the PTT controller 16 can be said to operate as a PTT system over the wireless infrastructure 14. Again, the method and apparatus contemplate operation in various embodiments of PTT systems with FIG. 1 presented for illustration purposes.

The PTT system in FIG. 1 includes an ability to present time delayed audio to users. Certain talk-burst audio may be presented to or by one or more subscribers in a time delayed fashion (with respect to "live") under certain circumstances, while also presented to or by one or more subscribers live (or substantially live based on propagation delays, etc.). For example, in FIG. 1, assume the communication device 12a is an originator or source of talk-burst audio destined for each member of a talk-group, i.e., the communication devices 12b, 12c, 12d, 12e, 12f. The communication devices 12b, 12c, 12d present the talk-burst audio live (as it originates from the source 12a) to associated users, but the communication devices 12e, 12f present the talk-burst audio in a delayed manner to associated users, i.e., delayed a short time (e.g., seconds) or a longer time (e.g., minutes to hours, etc.) with respect to the time it originated from the source 12a.

There can be various reasons for delaying presentation of the talk-burst audio for the communication devices 12e, 12f. For example, a given talk-burst on a given talk-group or in a given 1-to-1 (also known as a private call) may be delayed to a specific user if that user is, for example, already engaged in another private (or telephony or video) call or is already listening to another group talk-burst. Also, when a new user affiliates to a given talk-group, a series of recorded talk-bursts may be sent to that user, in efforts to provide situational awareness. Here, the recorded talk-bursts are delayed by definition. A user may appreciably reduce the volume on their communication device 12 (or turn off the device entirely) during a break or while conversing with a peer officer or citizen, such as in a Public Safety application. Moreover, the communication device may have a "do not disturb" mode, which can be activated in such circumstances.

Since the communication devices 12e, 12f are presenting delayed talk-burst audio, there has to be techniques to address PTT requests in response to the delayed talk-burst. For example, the communication devices 12e, 12f may not be aware the talk-burst audio is delayed. The present disclosure provides the techniques to determine an appropriate talk-back action, in response to a PTT request, when a user hears a combination of real-time and delayed audio.

Figure 2:
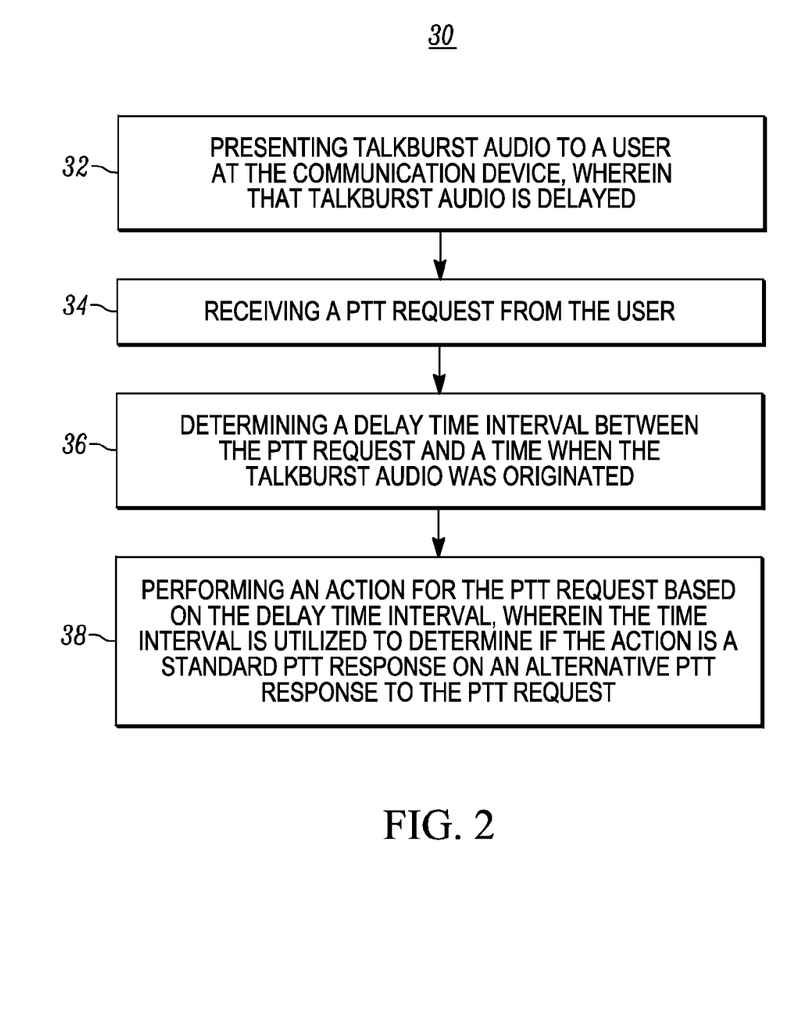
FIG. 2 is a flowchart of a process for delayed talk-back behavior in a communication device associated with a PTT system in accordance with some embodiments.

FIG. 2 is a flowchart of a process 30 for delayed talk-back behavior in a communication device 12 associated with a Push-to-Talk (PTT) system. The process 30 includes providing talk-burst audio to a user at the communication device, wherein the talk-burst audio is delayed (step 32), receiving a PTT request from the user (step 34), determining a delay time interval between the PTT request and a time when the talk-burst audio originated from the source (step 36), and performing an action for the PTT request based on the delay time interval, wherein the time interval is utilized to determine if the action is a standard PTT response or an alternative PTT response to the PTT request (step 38). The determining step 36 and the performing step 38 can performed by the communication device 12 or the PTT controller 16.

The process 30 describes new behavior, which, upon receipt of a PTT request from the communication device 12 which has just completed presentation of a delayed talk-burst, decides between adherence to standard PTT behaviors known in the art (e.g., talking back to the talk-group associated with the presented talk-burst) and taking an alternative action dependent upon the amount of time elapsed between the time when the talk-burst originated and the time when the talk-burst was ultimately presented to the user at the communication device 12, optionally combined with additional criteria.

The standard PTT response is utilized when the talk-burst audio is delayed up to a certain time period, and the alternative PTT response is utilized when the talk-burst audio is delayed beyond the certain time period. In one embodiment, the action can be redirection of a response after the PTT request to a voicemail box targeting only the user who originated the talk-burst audio. In another embodiment, the action can be redirection of a response after the PTT request to one or more console operators instead of members of a talk-group associated with the talk-burst audio. In yet another embodiment, the action can be redirection of a response after the PTT request to another talk-group, which has been designated as a replacement or superset of an original talk-group associated with the talk-burst audio. In yet another embodiment, the action can be blocking or denying the PTT request. In yet another embodiment, the action comprises ensuring the source who originated the talk-burst audio receives a response after the PTT request, regardless of whether the source has left a group associated with the talk-burst audio. In yet another embodiment, the action comprises ensuring a user(s) who received the talk-burst audio receives a response after the PTT request, regardless of whether the user(s) is still in a group associated with the talk-burst audio or the user(s) has left the group.

The alternative PTT responses or behaviors or alternate actions or behaviors can include one or a combination of one of more of the following, without limitation:

Redirecting talk-back audio, subsequent to the PTT request, to a voicemail box targeting the user who sourced the delayed talk-burst audio;

Redirecting the talk-back audio, subsequent to the PTT request, to a voicemail box targeting a user who has role-replaced the user who originated the delayed talk-burst audio;

Redirecting the talk-back audio, subsequent to the PTT request, to a private call targeting only the user who originated the delayed talk-burst audio;

Redirecting the talk-back audio, subsequent to the PTT request, to a private call targeting a user who has role-replaced the user who originated the delayed talk-burst audio;

Redirecting the talk-back audio, subsequent to the PTT request, to another talk-group to which the user who originated the delayed talk-burst audio is now a talk-group member;

Redirecting the talk-back audio, subsequent to the PTT request, to another talk-group which contains a user who has role-replaced the user who originated the delayed talk-burst audio;

Redirecting the talk-back audio, subsequent to the PTT request, to one or more different talk-groups, which have been designed as a replacement or superset of the original talk-group target;

Redirecting the talk-back audio, subsequent to the PTT request, to one or more console operators, but not the talk-group members at large;

Redirecting the talk-back audio, subsequent to the PTT request, to a subset of talk-group users, but not the talk-group members at large; and Blocking the talk-back altogether and optionally prompting the user to use a different media for response (e.g., a text message).

Automatic conversion of the talk-back media from voice to another media (e.g., a text message).

Figure 3:
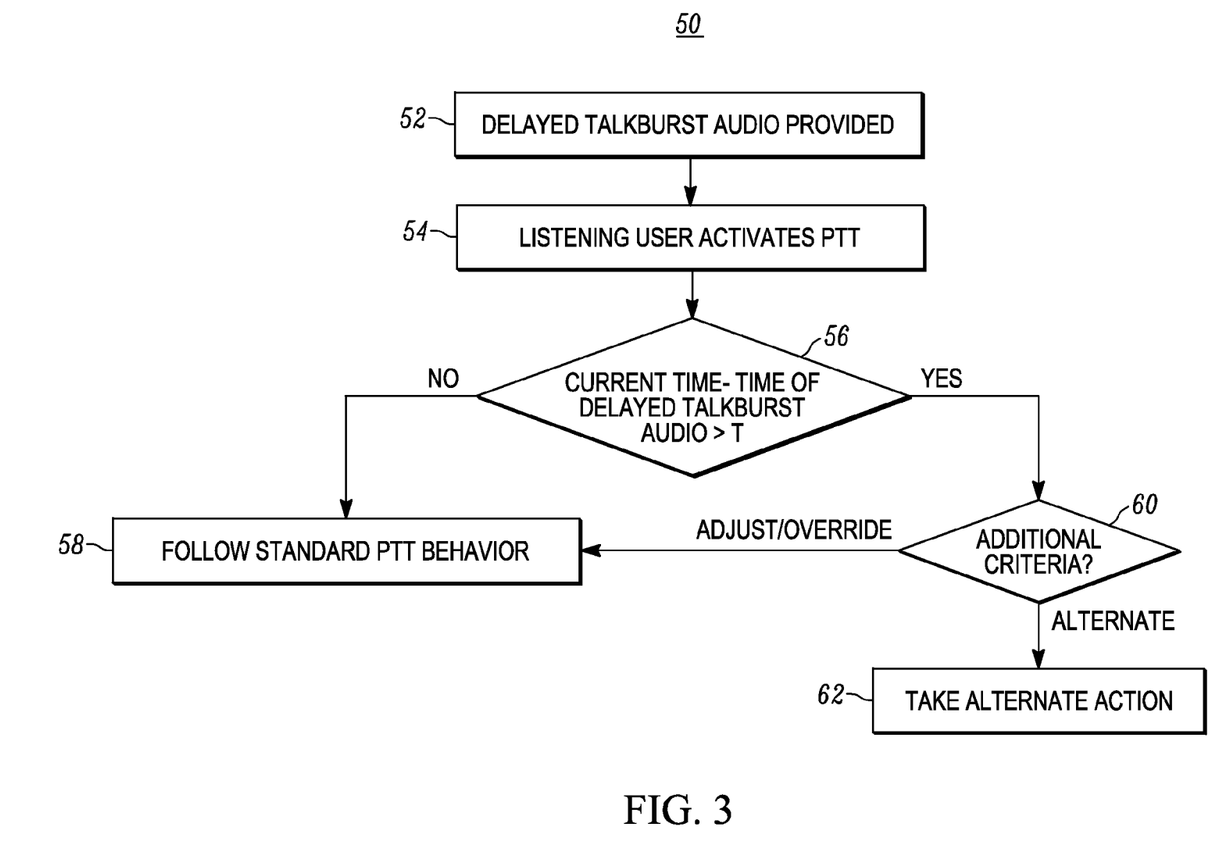
FIG. 3 is a flowchart of another process for delayed talk-back behavior in a communication device associated with a Push-to-Talk (PTT) system in accordance with some embodiments.

FIG. 3 is a flowchart of another process 50 for delayed talk-back behavior in a communication device 12 associated with a Push-to-Talk (PTT) system. The process 50 provides different criteria for the process 30. In the process 50, delayed talk-burst audio is provided (step 52). That is, the communication device 12 receives and plays delayed talk-burst audio. Subsequent to the delayed talk-burst audio, a user associated with the communication device 12 activates PTT (step 54), i.e., makes a PTT request. The PTT request is in response to the delayed talk-burst audio, and note, the user may or may not be aware the delayed talk-burst audio is in fact delayed and not live. The process 50 checks a difference between the current time and a time that the delayed talk-burst audio originated, i.e., a time between talkburst origination, and whether it is above a threshold, T (step 56).

If the difference is not above the threshold (step 56), the process 50 leads to the communication device 12 following standard PTT behavior (step 58). Here the delayed talk-burst audio is delayed, but not by an amount more than the threshold, T, so standard behavior is followed. For example, this can indicate that despite being delayed, the delay is short and a live response is appropriate. If the difference is above the threshold (step 56), the process 50 evaluates additional criteria (step 60). The additional criteria can assist in determining whether the process 50 takes an alternate action (step 62) or adjusts/overrides and follows the standard PTT behavior (step 58).

The additional criteria can include, without limitation, determining if the user who originated the delayed talk-burst is still a member of the talk-group on which the audio was sourced; if the talk-group has been given a special designation (e.g., an incident talk-group), determining if the current designation of the talk-group matches the designation of the talk-group at the time the delayed talk-burst was originally sourced; determining the role of the user who originated the delayed talk-burst, and determining if that user is currently serving that same role as when the delayed talk-burst was originally sourced; determining the role of the user who is listening to the delayed talk-burst, and determining if that user is currently serving that same role as when the delayed talk-burst was originally sourced; and the like.

In instances where the time gap is quite large, the delayed talk-burst audio (which originally triggered a receiving user to talk-back) may even replayed to one or more users (e.g., the user who originally sourced the delayed audio, the console operator, or all selected users) before playing the talk-back audio (including the voicemail use case) in order to provide context of the talk-back audio. In general, a policy may dictate which action is taken dependent on the age of the delayed talk-burst which was presented and the additional criteria.

Figure 4:
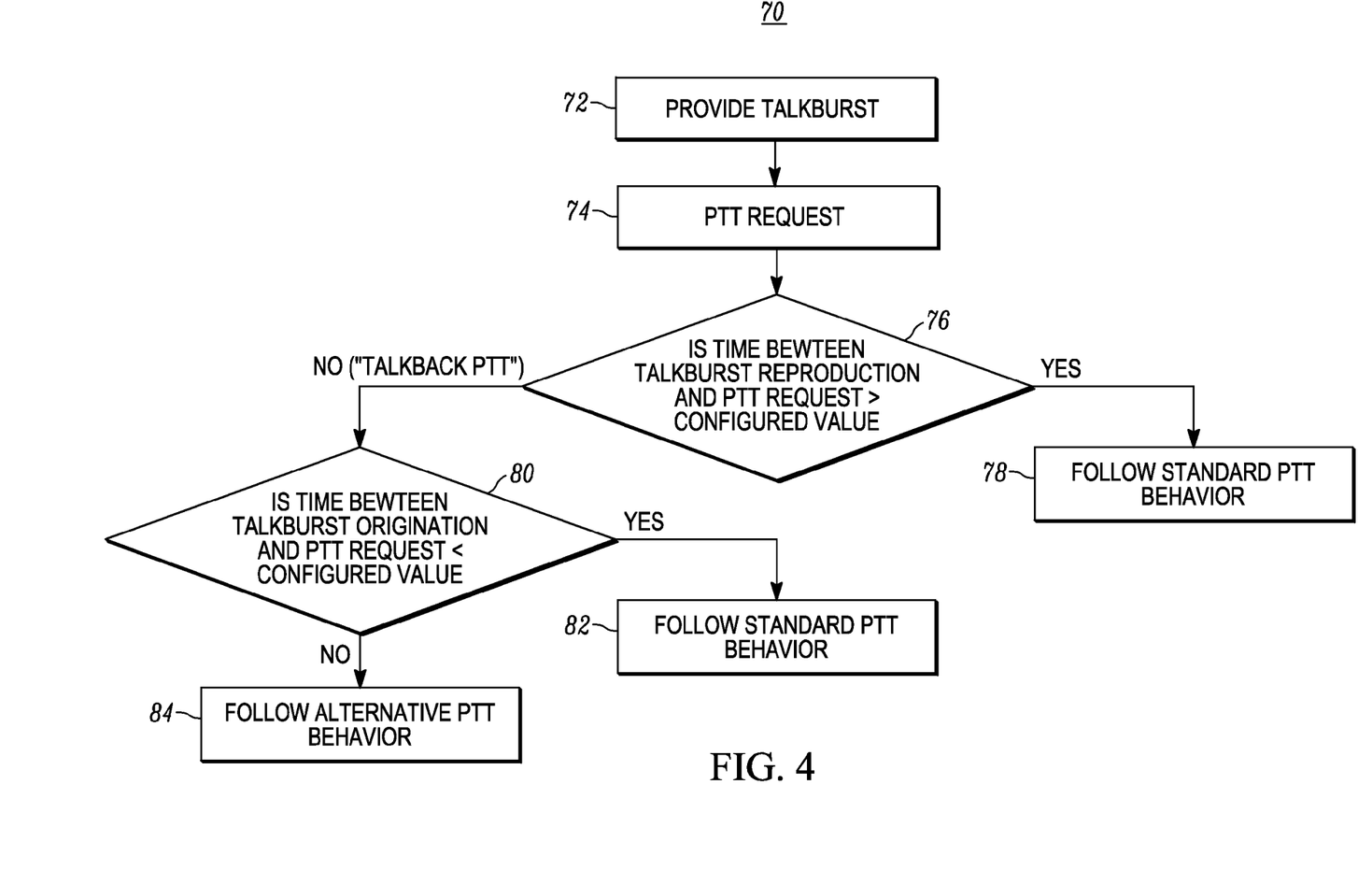
FIG. 4 is a flowchart of a process talk-back behavior in a communication device associated with a Push-to-Talk (PTT) system in accordance with some embodiments.

FIG. 4 is a flowchart of a process 70 talk-back behavior in a communication device 12 associated with a Push-to-Talk (PTT) system. Specifically, the process 70 is for any type of talk-burst audio, and provides additional clarifications from the processes 30, 50 described herein. First, a talk-burst is provided to a communication device 12, either live or delayed (step 72). Subsequent to the talk-burst, a PTT request is detected (step 74). The PTT request is in response to the talk-burst. The process 70 includes determining a whether a time difference between the talk-burst reproduction (i.e., when the talk-burst is provided at the communication device 12) and the PTT request is greater than a configured value (step 76). If so, the process 70 includes following standard PTT behavior (step 78). That is, if the time difference is greater than the configured value, the PTT request is not in response to the talk-burst in step 72. For example, if the talk-burst is provided at the communication device 12 and the PTT request is a significant amount of time later, e.g., several seconds, it is assumed the PTT request is not in response to the talk-burst, but rather a new request, and the standard behavior can be a new talk-burst to a talk-group.

If the time difference is not greater than the configured value (step 76), the PTT request is a talk-back PTT request, i.e. in response to the talk-burst. The process 70 includes checking the time difference between the talk-burst origination and the PTT request and whether that time difference is less than a configured value (step 80). Here, the process 70 is looking at the difference between when the talk-burst in step 72 was sourced and when the PTT request in step 74 occurred. If it is less than the configured value, the process 70 includes following standard PTT behavior (step 82), such as a live talk-back. If the time difference is greater than the configured value, the process 70 can conclude the talk-burst in step 72 was delayed and the time difference was large enough to trigger alternative PTT behavior (step 84). Note, the step 80, the talk-burst could be delayed or live—whether or not the process 70 dictates standard or alternate behavior is based on the time difference, not on whether the talk-burst is delayed or live.

In an exemplary embodiment, the processes 30, 50, 70 can be invoked in the communication devices 12. Here, the communication devices 12 can timestamp all "live" audio received. If the communication devices 12 is currently unable to present the received audio (e.g., the user is listening to another talk-burst, or the radio), the audio is recorded and stored, along with at least the origination timestamp. In another embodiment, the processes 30, 50, 70 can be invoked in the infrastructure 14. Here, the infrastructure 14 controls when talk-bursts are presented at a subscriber, and appends at least a timestamp to all transmitted talk-bursts indicating the time when the talk-burst originated. Other metadata may be transmitted as required to facilitate the desired talk-back action, including, but not limited to, the originator ID and the talk-group ID. In another exemplary embodiment, the processes 30, 50, 70 can be invoked in an IAN (Incident Area Network) gateway. Here, the IAN gateway controls when infrastructure-originated talk-bursts are repeated to devices in the IAN, and appends a timestamp to all transmitted talk-bursts indicating the time when the talk-burst was originated.

Also, the communication devices 12 could implement an appropriate User Interface (UI) to override an automated redirect of talk-back audio. Additionally, the communication devices 12 may provide visual or audible notification to users when they hear delayed talk-bursts, or when they are hearing talk-back as a result of a delayed talk-burst. Additionally, the time threshold which triggers the alternate action may be variable dependent on operating criteria, such as density of talk-bursts on a talk-group, talk-group-specific settings, etc.

Figure 5:
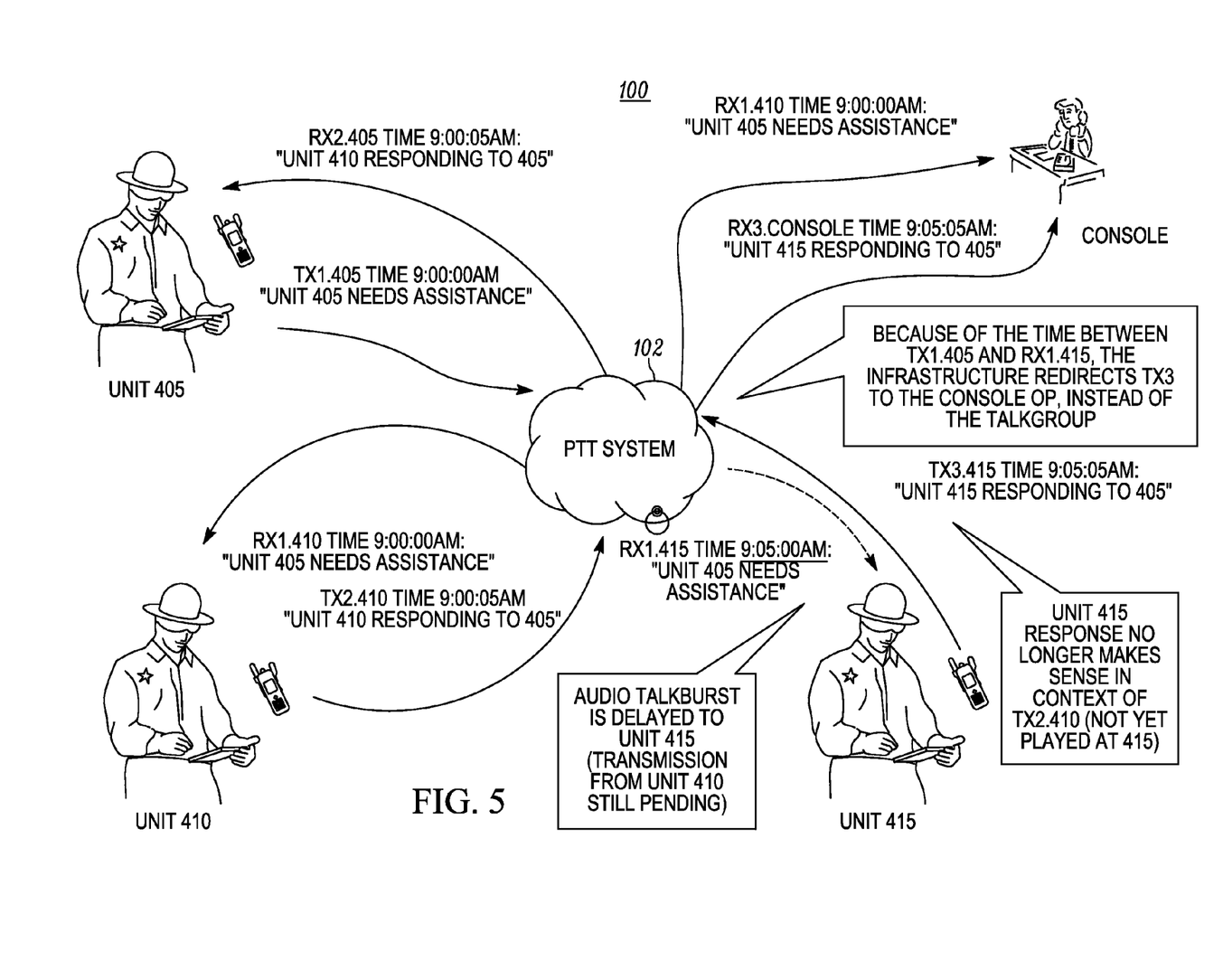
FIG. 5 is a diagram of an exemplary operation of the delayed PTT talk-back in a public safety application in accordance with some embodiments.

FIG. 5 is a diagram of an exemplary operation 100 of the delayed PTT talk-back in a public safety application. Here, a PTT system 102 can include the communication system 10 or the like to provide delayed PTT talk-back. The operation 100 is illustrated with units 405, 410, 415, and a console operator all communicatively coupled to the PTT system 102. At a time 9:00:00 AM, the unit 405 originates a first talk-burst "unit 405 needs assistance," which is received by the unit 410 and the console operator. However, it is not presented by the unit 415, e.g., the unit 415 is on another call or in silent mode. At a time 9:00:05 AM, the unit 410 originates a second PTT talk-back of "unit 410 responding to 405."

Now, at a time 9:05:00 AM, a delayed talk-burst is presented to the unit 415 of the first talk-burst (originated at 9:00:00 AM)—"unit 405 needs assistance." The unit 415 then originates a talk-back of "unit 415 responding to unit 405" at time 9:05:05 AM. However, since this talk-back originates 5 minutes after the origination time of the first talk-burst, it does not make sense to broadcast this talk-back. Instead, the talk-back is redirected to the console operator only. The console operator can respond accordingly to the unit 415.

Figure 6:
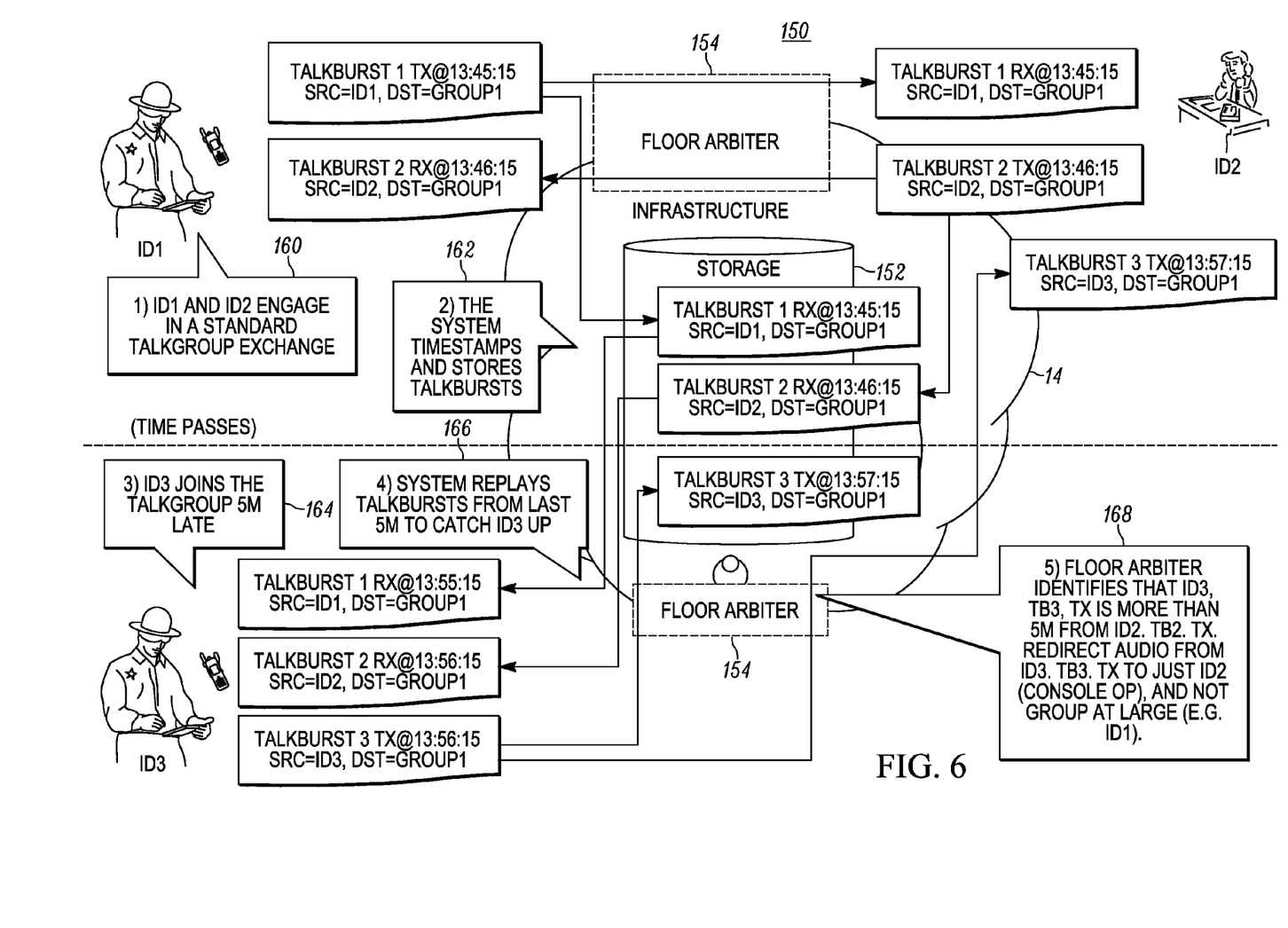
FIG. 6 is another diagram of an exemplary operation of the delayed PTT talk-back in a public safety application in accordance with some embodiments.

FIG. 6 is another diagram of an exemplary operation 150 of the delayed PTT talk-back in a public safety application. Here, the operation 150 is shown with respect to the infrastructure 14 of the communication system 10 along with storage 152 and a floor arbiter 154. The storage 152 is used to store delayed talk-bursts and the floor arbiter 154 is configured to determine who gets access to talk. These components 152, 154 can be part of the PTT controller 16, the infrastructure 14, the communication devices 12, and/or a combination thereof. The operation 150 is also illustrated with respect to three entities ID1, ID2, ID3—where ID1, ID3 are officers and ID2 is a console operator.

First, in the operation 150, ID1 originates a talk-burst 1, allowed by the floor arbiter 154, at 13:45:15, SRC=ID1, DST=GROUP1 which is presented by ID2, which is a member of the GROUP1. The talk-burst 1 is also provided to the storage 152 where it is stored. Next, ID2 originates a talk-burst 2, allowed by the floor arbiter 154 and also stored by the storage 152, SRC=ID2, DST=GROUP1. Thus, ID1 and ID2 are engaged in a standard talk-group exchange (step 160) and the storage 152 stores these talk-bursts (step 162).

Later, ID3 joins the talk-group, e.g., 5 minutes late—13:55:00 (step 164). The storage 152 is configured to provide the stored talk-bursts to ID3 from the last 5 minutes, at 13:55:15 and 13:56:15. for ID3 to catch up (step 166). In conjunction with catching up, ID3 provides a PTT request for a talk-burst 3 to talk-back, at 13:56:45. The floor arbiter 154 identifies that the talk-burst 3 (ID3.TB3.TX) is more than 5 minutes from the talk-burst 2 (ID2.TB2.TX), and redirects audio from the talk-burst 3 to just ID2 (console operator), and not group at large (e.g., ID1) (step 168).

Figure 7:
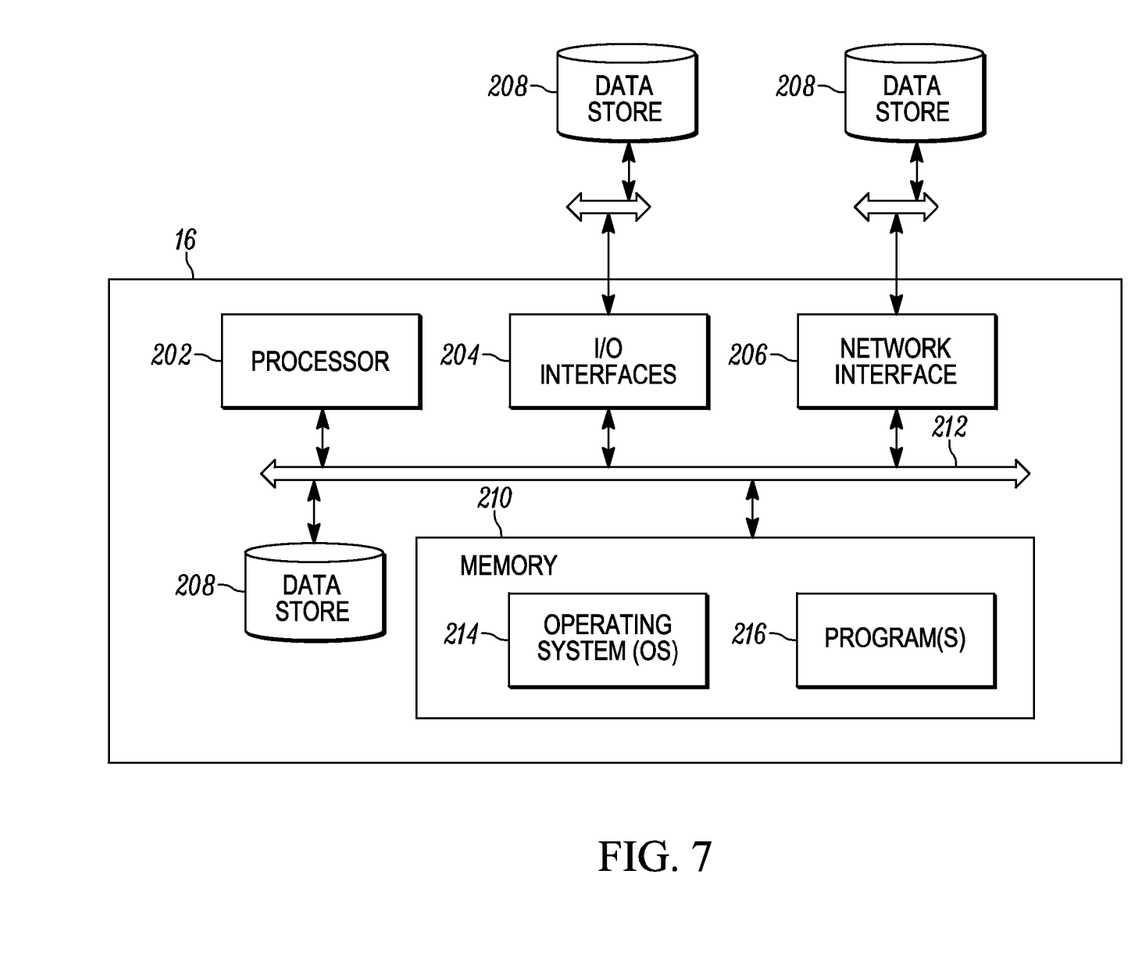
FIG. 7 is a block diagram of a PTT controller 16 in the communication system in accordance with some embodiments.

FIG. 7 is a block diagram of a PTT controller 16 in the communication system 10. Specifically, the PTT controller 16 can implement some or all of the various processes described herein. The PTT controller 16 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 7 depicts the PTT controller 16 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the PTT controller 16, a semiconductor-based microprocessor (in the form of a microchip or chip set), or generally any device for executing software instructions. When the PTT controller 16 is in operation, the processor 202 is configured to execute software stored within the memory 210, to communicate data to and from the memory 210, and to generally control operations of the PTT controller 16 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), iSCSI, a PCI Express interface (PCI-x), an infrared (IR) interface, a radio frequency (RF) interface, and/or a universal serial bus (USB) interface.

The network interface 206 may be used to enable the PTT controller 16 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications in the radio communication system 10. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the PTT controller 16 such as, for example, an internal hard drive connected to the local interface 212 in the PTT controller 16. Additionally in another embodiment, the data store 208 may be located external to the PTT controller 16 such as, for example, an external hard drive connected to the I/O interfaces 204 (e.g., SCSI or USB connection). In a further embodiment, the data store 208 may be connected to the PTT controller 16 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, including those steps described in FIGS. 1-6.

Figure 8:
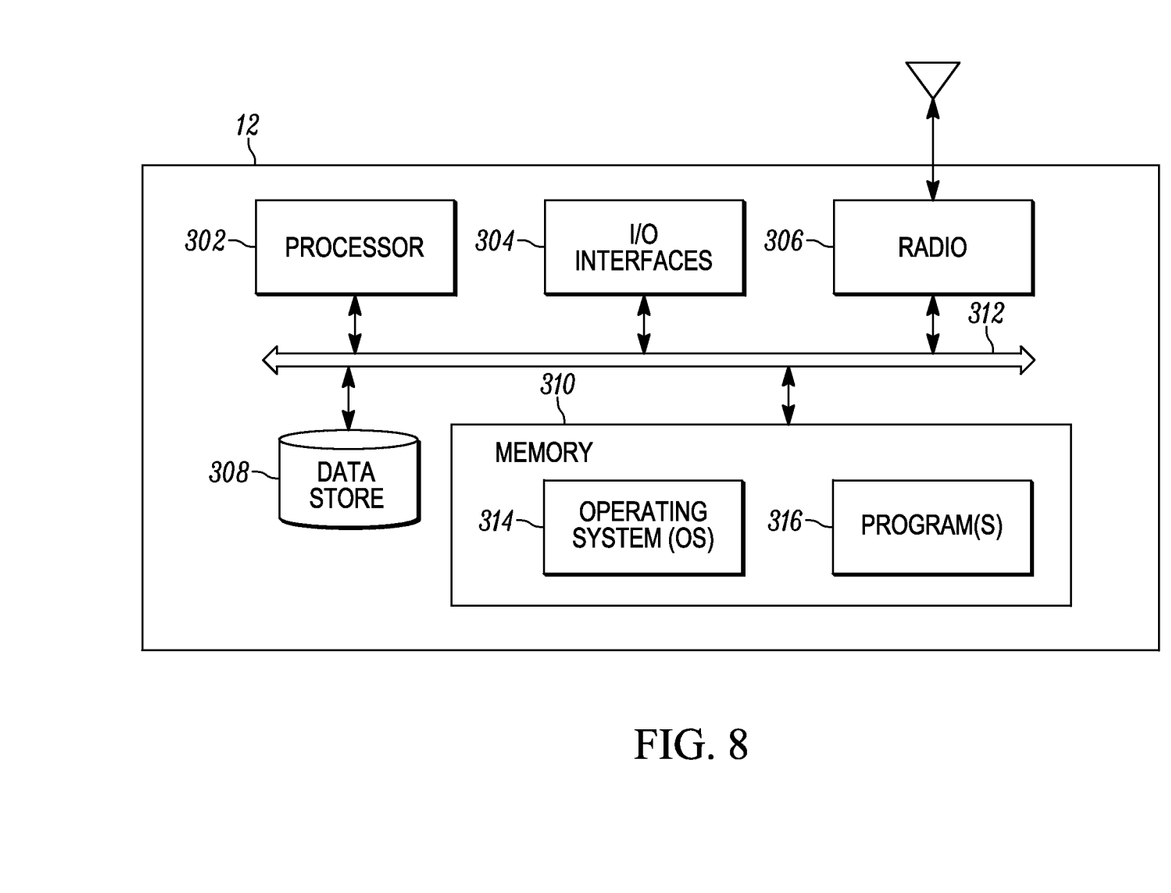
FIG. 8 is a block diagram of a communication device, which may be used in the communication system of FIG. 1 or the like, in accordance with some embodiments.

FIG. 8 is a block diagram of a communication device 12, which may be used in the communication system 10 or the like, in accordance with some embodiments. For example, the communication device 12 can include, without limitation, a smart phone, a radio, a tablet, a vehicle modem, etc. The communication device 12 can be a digital device that, in terms of hardware architecture, generally includes a processor 302, input/output (I/O) interfaces 304, a radio 306, a data store 308, and memory 310. It should be appreciated by those of ordinary skill in the art that FIG. 8 depicts the memory 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the memory 310, a semiconductor-based microprocessor (in the form of a microchip or chip set), or generally any device for executing software instructions. When the communication device 12 is in operation, the processor 302 is configured to execute software stored within the memory 310, to communicate data to and from the memory 310, and to generally control operations of the communication device 12 pursuant to the software instructions. In an exemplary embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the memory 310.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 8, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the communication device 12, including those communication device functions set forth in FIGS. 1-6.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for delayed talk-back behavior in a communication device associated with a Push-to-Talk (PTT) system, the method comprising:
   presenting talk-burst audio to a user at the communication device, wherein the talk-burst audio is delayed;
   receiving a PTT request from the user;
   determining a delay time interval between the PTT request and a time when the talk-burst audio was originated; and
   performing an action for the PTT request based on the delay time interval, wherein the time interval is utilized to determine if the action is a standard PTT response or an alternative PTT response to the PTT request;
   wherein the standard PTT response is utilized when the talk-burst audio is delayed up to a certain time period, and the alternative PTT response is utilized when the talk-burst audio is delayed beyond the certain time period;
   wherein the action is one of:
   redirection of a response after the PTT request to one or more console operators instead of members of a talk-group associated with the talk-burst audio, or redirection of a response after the PTT request to another talk-group, which has been created as a replacement or superset of an original talk-group associated with the talk-burst audio;
   blocking or denying the PTT request;
   ensuring the originator of the talk-burst audio receives a response after the PTT request, regardless of whether the source has left a group associated with the talk-burst audio;
   ensuring the one or more users who received the original talk-burst audio receives a response after the PTT request, regardless of whether those one or more users are still in a group associated with the talk-burst audio or the one or more users have left the group.

2. The method of claim 1, wherein the determining step and the performing step is performed by the communication device or a PTT controller.

3. The method of claim 1, wherein the talk-burst audio is delayed by either the communication device or by a server in the PTT system, and wherein the delay time interval is determined independent of how the talk-burst audio is delayed.

4. The method of claim 1, wherein the action is automatic conversion of media from voice to another media.

5. A communication device configured for delayed talk-back behavior in a Push-to-Talk (PTT) system, the communication device comprising:
   a network interface coupled to a processor; and
   memory storing instructions that, when executed, cause the processor to:
   present talk-burst audio to a user of the communication device, wherein the talk-burst audio is delayed;
   detect a PTT request from the user;
   determine a delay time interval between the PTT request and a time when the talk-burst audio was originated; and
   perform an action for the PTT request based on the delay time interval, wherein the time interval is utilized to determine if the action is a standard PTT response or an alternative PTT response to the PTT request;
   wherein the standard PTT response is utilized when the talk-burst audio is delayed up to a certain time period, and the alternative PTT response is utilized when the talk-burst audio is delayed beyond the certain time period;

wherein the action is one of:
  redirection of a response after the PTT request to one or more console operators instead of members of a talk-group associated with the talk-burst audio, or redirection of a response after the PTT request to another talk-group, which has been created as a replacement or superset of an original talk-group associated with the talk-burst audio;
  blocking or denying the PTT request;
  ensuring the originator of the talk-burst audio receives a response after the PTT request, regardless of whether the source has left a group associated with the talk-burst audio;
  ensuring the one or more users who received the original talk-burst audio receives a response after the PTT request, regardless of whether those one or more users are still in a group associated with the talk-burst audio or the one or more users have left the group.

6. A Push-to-Talk (PTT) controller configured for delayed talk-back behavior, the PTT controller comprising:
  a network interface coupled to a processor; and
  memory storing instructions that, when executed, cause the processor to:
  present talk-burst audio to a user of the communication device, wherein the talk-burst audio is delayed;
  receive a PTT request from the user;
  determine a delay time interval between the PTT request and a time when the talk-burst audio was originated; and
  perform an action for the PTT request based on the delay time interval, wherein the time interval is utilized to determine if the action is a standard PTT response or an alternative PTT response to the PTT request;
    wherein the standard PTT response is utilized when the talk-burst audio is delayed up to a certain time period, and the alternative PTT response is utilized when the talk-burst audio is delayed beyond the certain time period;
  wherein the action is one of:
    redirection of a response after the PTT request to one or more console operators instead of members of a talk-group associated with the talk-burst audio, or redirection of a response after the PTT request to another talk-group, which has been created as a replacement or superset of an original talk-group associated with the talk-burst audio;
    blocking or denying the PTT request;
    ensuring the originator of the talk-burst audio receives a response after the PTT request, regardless of whether the source has left a group associated with the talk-burst audio;
    ensuring the one or more users who received the original talk-burst audio receives a response after the PTT request, regardless of whether those one or more users are still in a group associated with the talk-burst audio or the one or more users have left the group.

\* \* \* \* \*